US007624384B2

(12) United States Patent
Zhang et al.

(10) Patent No.: US 7,624,384 B2
(45) Date of Patent: Nov. 24, 2009

(54) APPARATUS, SYSTEM, AND METHOD OF DYNAMIC BINARY TRANSLATION WITH TRANSLATION REUSE

(75) Inventors: Peng Zhang, Shanghai (CN); Jianhui Li, Shanghai (CN); Alex Skaletsky, Zoran (IL); Orna Etzion, Haifa (IL)

(73) Assignee: Intel Corporation, Santa Clara, CA (US)

( * ) Notice: Subject to any disclaimer, the term of this patent is extended or adjusted under 35 U.S.C. 154(b) by 520 days.

(21) Appl. No.: 10/999,115

(22) Filed: Nov. 30, 2004

(65) Prior Publication Data

US 2006/0114132 A1 Jun. 1, 2006

(51) Int. Cl.
G09F 9/45 (2006.01)
G09F 9/44 (2006.01)

(52) U.S. Cl. ...................... 717/136; 717/120
(58) Field of Classification Search ......... 717/136–142, 717/151, 153, 120
See application file for complete search history.

(56) References Cited

U.S. PATENT DOCUMENTS

| | | | | |
|---|---|---|---|---|
| 5,481,712 A | * | 1/1996 | Silver et al. | 717/109 |
| 6,330,691 B1 | * | 12/2001 | Buzbee et al. | 714/35 |
| 6,463,582 B1 | * | 10/2002 | Lethin et al. | 717/158 |
| 6,523,171 B1 | * | 2/2003 | Dupuy et al. | 717/136 |
| 6,609,248 B1 | | 8/2003 | Srivastava et al. | |
| 6,694,338 B1 | * | 2/2004 | Lindsay | 707/203 |
| 6,704,925 B1 | * | 3/2004 | Bugnion | 717/138 |
| 6,772,413 B2 | * | 8/2004 | Kuznetsov | 717/136 |
| 6,820,255 B2 | * | 11/2004 | Babaian et al. | 717/151 |
| 7,000,226 B2 | * | 2/2006 | Gao et al. | 717/136 |
| 7,017,162 B2 | * | 3/2006 | Smith et al. | 719/328 |
| 7,065,744 B2 | * | 6/2006 | Barker et al. | 717/109 |
| 7,219,335 B1 | * | 5/2007 | Moas et al. | 717/134 |
| 7,240,326 B2 | * | 7/2007 | Barker et al. | 717/105 |
| 7,318,216 B2 | * | 1/2008 | Diab | 717/108 |
| 2002/0087954 A1 | * | 7/2002 | Wang et al. | 717/131 |
| 2003/0088860 A1 | * | 5/2003 | Wang | 717/153 |
| 2005/0086648 A1 | * | 4/2005 | Andrews et al. | 717/135 |
| 2005/0120333 A1 | * | 6/2005 | Inoue et al. | 717/120 |

* cited by examiner

*Primary Examiner*—Wei Y Zhen
*Assistant Examiner*—Chih-Ching Chow
(74) *Attorney, Agent, or Firm*—Pearl Cohen Zedek Latzer, LLP

(57) ABSTRACT

Embodiments of the invention disclose a method, apparatus and system of translating a source binary code into a target binary code. The translation according to embodiments of the invention may include determining whether or not a previously translated code block that relates to a source fragment to be currently translated may be reused for execution by a target processor. A reusability status of the previously translated code block may be determined based on a reusability status of a group of previously translated code blocks. In some embodiments, when no previously translated code blocks relating to the currently translated source fragment are found, the source fragment may be translated into a new target code block, which may be executed by the target processor. The new target code block may then be added to a group of previously translated code blocks.

21 Claims, 6 Drawing Sheets

APPARATUS, SYSTEM, AND METHOD OF DYNAMIC BINARY TRANSLATION WITH TRANSLATION REUSE

BACKGROUND OF THE INVENTION

A dynamic binary translator is a real time compiler that translates a source binary code complying with the architecture of a source processor ("source architecture") into a target binary code complying with the architecture of a target processor ("target architecture"). The translation process takes place during execution of the source binary code. In order to improve execution speed of the source binary code, the dynamic binary translator may need to reduce overhead during the translation process. Overhead may include, for example, repetitive translation of a same fragment or same set of instructions of the source binary code, redundancy in saving a same set of instructions or same fragment of the source binary code being translated, etc.

Reusing translated target binary code, commonly referred to as "translation reuse", may be an effective way to reduce the overhead incurred by the dynamic binary translator. For example, if the source binary code is unchanged during execution, the relating translated target binary code may be reused. Translation reuse may require verifying consistency of the source instruction to be currently translated compared to previously translated source instruction relating to the target binary code to be reused. To ensure consistency, a no-fault verification method may require saving all the fragments of the source binary code that affect the translation, and comparing all the saved fragments with a fragment to be executed. Unfortunately, "blindly" saving and comparing all the fragments of the source binary code may be highly space and time consuming, and even impossible. In addition, because a dynamic binary translator may not be able to discover the exact boundaries of functions of the source binary code, a conventional dynamic binary translator may need to rely on an inaccurate verification procedure to verify consistency of the source binary code, leaving certain functional issues unresolved.

BRIEF DESCRIPTION OF THE DRAWINGS

The invention will be understood and appreciated more fully from the following detailed description of embodiments of the invention, taken in conjunction with the accompanying drawings of which.

Figure 1:
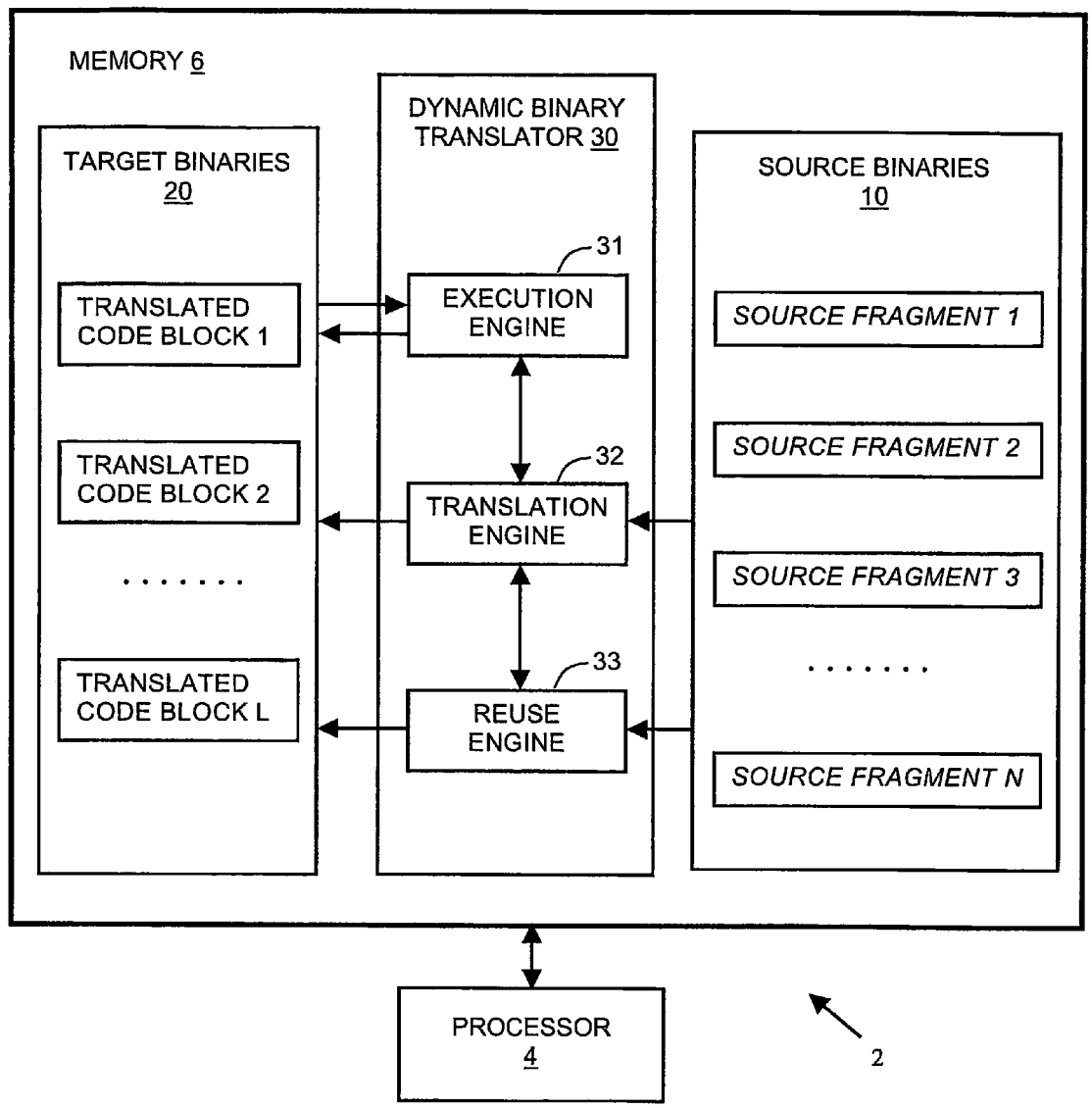
FIG. 1 is a block diagram illustration of an apparatus capable of translating a source binary code into a target binary code with translation reuse features according to some exemplary embodiments of the invention.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

In the following detailed description, numerous specific details are set forth in order to provide a thorough understanding of embodiments of the invention. However it will be understood by those of ordinary skill in the art that embodiments of the invention may be practiced without these specific details. In other instances, well-known methods and procedures have not been described in detail so as not to obscure the embodiments of the invention.

Some portions of the detailed description in the following are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Some embodiments of the invention may be implemented, for example, using a machine-readable medium or article which may store an instruction or a set of instructions that, if executed by a machine, cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, e.g., memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

Embodiments of the invention may include apparatuses for performing the operations herein. These apparatuses may be specially constructed for the desired purposes, or they may include a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROM), random access memories (RAM), electrically programmable read-only memories (EPROM), electrically erasable and programmable read only memories (EEPROM), magnetic or optical cards, or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the invention are not described with reference to any particular programming language. It will be appreciated that a variety of programming languages may be used to implement the teachings of the invention as described herein.

In the following description, various figures, diagrams, flowcharts, models, and descriptions are presented as different means to effectively convey the substances and illustrate different embodiments of the invention that are proposed in this application. It shall be understood by those skilled in the art that they are provided merely as exemplary samples, and shall not be constructed as limitation to the invention.

FIG. 1 is a block diagram illustration of an apparatus 2 such as, for example, a computing platform, including a processor 4 operatively connected to a memory 6. Memory 6 may be capable of storing, inter alia, a set of instructions of a source binary code 10 ("source binaries"), a set of instructions of a target binary code 20 ("target binaries"), and a dynamic binary translator 30 according to some exemplary embodiments of the invention.

A non-exhaustive list of examples for apparatus 2 may include a desktop personal computer, a workstation, a server computer, a laptop computer, a notebook computer, a handheld computer, a personal digital assistant (PDA), a mobile telephone, a game console, and the like.

A non-exhaustive list of examples for processor 4 may include a central processing unit (CPU), a digital signal processor (DSP), a reduced instruction set computer (RISC), a complex instruction set computer (CISC) and the like. Moreover, processor 4 may be part of an application specific integrated circuit (ASIC), or may be part of an application specific standard product (ASSP).

A non-exhaustive list of examples for memory 6 may include one or any combination of the following semiconductor devices, such as synchronous dynamic random access memory (SDRAM) devices, RAMBUS dynamic random access memory (RDRAM) devices, double data rate (DDR) memory devices, static random access memory (SRAM), flash memory devices, electrically erasable programmable read only memory devices (EEPROM), non-volatile random access memory devices (NVRAM), universal serial bus (USB) removable memory, and the like; optical devices, such as compact disk read only memory (CD ROM), and the like; and magnetic devices, such as a hard disk, a floppy disk, a magnetic tape, and the like. Memory 6 may be fixed within or removable from apparatus 2.

Source binary code 10, also referred to herein as source binaries, may comply with a source architecture, and a non-limiting example for the source architecture may include the Intel® architecture-32 (IA-32). Target binary code 20, also referred to herein as target binaries, may comply with a target architecture, and a non-limiting example for the target architecture may be the Intel® Itanium. If the source architecture does not comply with the target architecture, as is the case, for example, with the IA-32 and Itanium architectures, processor 4 may not be able to execute source binary code 10.

According to some exemplary embodiments of the invention, processor 4 may invoke dynamic binary translator 30 to translate source binary code 10 into target binary code 20. While fragments of source binary code 10 are being translated into code blocks of target binary code 20, processor 4 may execute the translated code blocks of target binary code 20. The results of executing the translated code blocks of target binaries 20 may generally correspond to the results of executing source binary code 10 on a processor that complies with the source architecture.

Dynamic binary translator 30 may translate source binaries 10 in fragments into code blocks of target binaries 20 for execution by a target processor complying with a target architecture. A source fragment, or code fragment, may be a source binary instruction, a basic instruction code, a code page, or other code size.

As shown in FIG. 1, dynamic binary translator 30 may include, for example, an execution engine 31, a translation engine 32, and a reuse engine 33. As translator 30 translates the source binaries to be executed by processor 4, execution engine 31 may direct the flow of execution of processor 4 through the translated code blocks. When the execution flow to be carried out by processor 4 reaches a source fragment, e.g., a source instruction or a set of source instructions of any size, for which execution engine 31 is not able to locate a corresponding translated code block, execution engine 31 may send a translation request to translation engine 32.

Upon receiving the translation request, translation engine 32 may attempt to query for a previously translated code block that may potentially be reused to perform the instructions included in the source fragment. A potentially reusable code block may be a code block that has been previously translated from the same source fragment but may not be currently accessible by the execution engine 31. To search for such a potentially reusable code block, translation engine 32 may send a reuse request to reuse engine 33. If a potentially reusable translated code block is identified, reuse engine 33 may proceed to verify the consistency of the source fragment that corresponds to the identified code block, thereby to determine a reusability status of the identified code block. A source fragment is considered consistent if each and every instruction in the source fragment is exactly the same as it was before, for example, when the source fragment was originally translated. The reusable translated code block may then be passed to execution engine 31 for execution.

If the previously translated code block is determined to be unusable, e.g., because its corresponding source fragment has been changed or modified, or if no previously translated code block is found to be associated with, e.g., translated from, the source fragment to be currently translated, then translation engine 32 may translate the current source fragment and pass a newly translated code block to be executed by execution engine 31.

Figure 2:
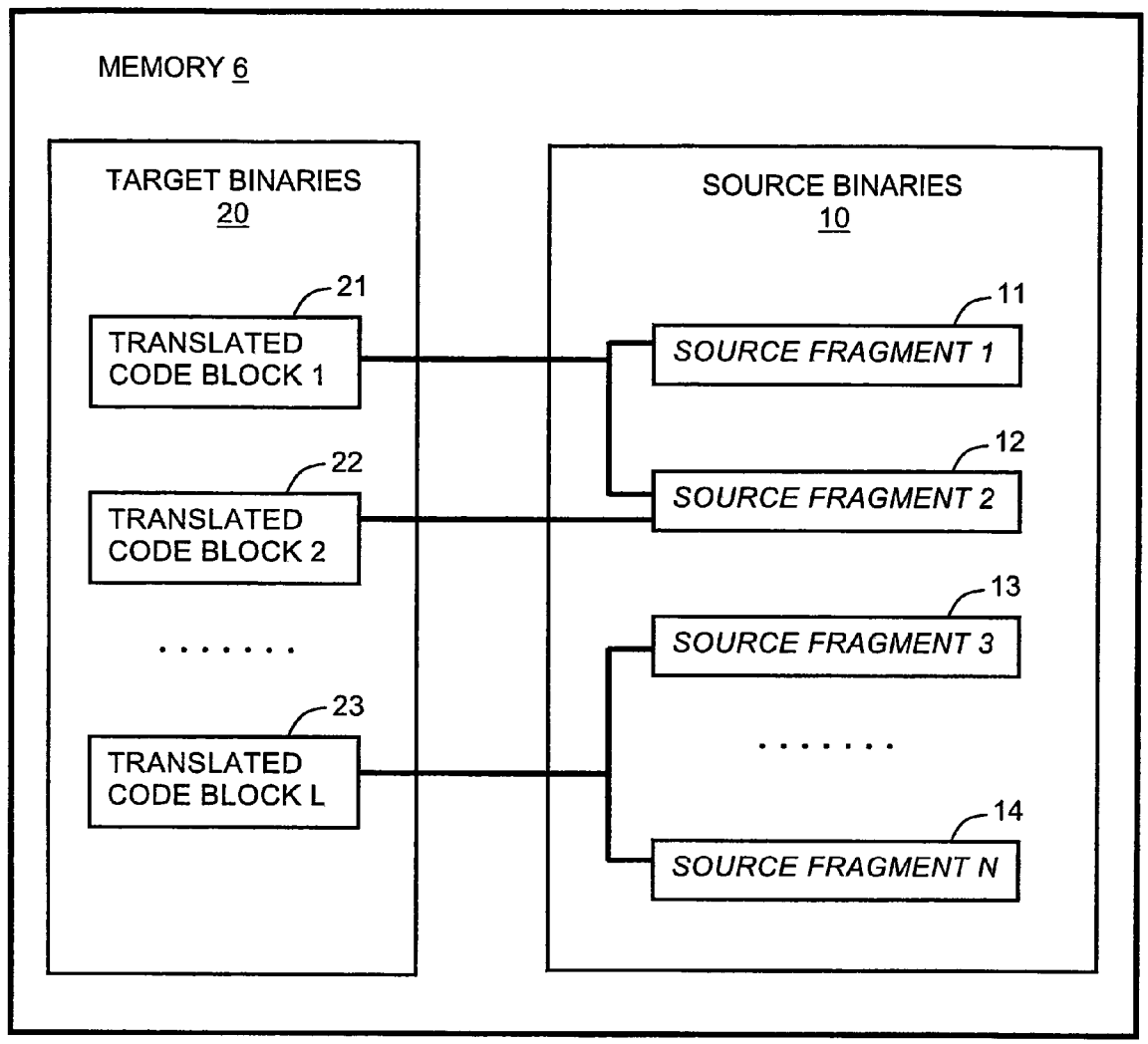
FIG. 2 is a block diagram illustration of a memory having stored therein fragments of a source binary code and related code blocks of a target binary code according to some exemplary embodiments of the invention.

FIG. 2 is a block diagram illustration of a memory having stored therein fragments of a source binary code 10 and related code blocks of a target binary code 20 according to exemplary embodiments of the invention.

As shown in FIG. 2, when a source fragment, e.g., source fragment 11, is translated into a target code block, e.g., code block 21, the target code block may also relate to one or more other source fragments such as, for example, source fragment 12, in addition to source fragment 11. This may be achieved by global optimization performed by the dynamic binary translator. When global optimization is performed on translated code block 21, certain functions used in translated code block 21 may be realized sharing a translated code block of a different source fragment. FIG. 2 also shows that translated code block 22 may be associated with source fragment 12, and translated code block 23 may be associated with source fragments 13 and 14.

A set of source fragments that are used in global optimization to translate and/or to optimize a translated code block may be referred to herein as the "Related Source Binaries" (RSB) of that translated code block. For example, as is shown in FIG. 2, source fragments 11 and 12 may be the RSB of translated code block 21, source fragment 12 may be the RSB of translated code block 22, and source fragments 13 and 14 may be the RSB of translated code block 23.

It will be appreciated that if all source fragments in the RSB of a previously translated code block are consistent, that is, each and every instruction of the RSB source fragments is the same as it was before, e.g., when previously (e.g., most recently) translated, then the previously translated code block may be guaranteed to execute the correct instructions for the current source fragment. The translated code block may then be identified as safely reusable.

Therefore, according to exemplary embodiments of the present invention, verification of reusability status of a translated code block may be limited to verifying the consistency of only those source fragments that are related to the translated code block. Such source fragment verification, that is, verification of only the RSB elements of the translated code block, ensures correctness of the reused target code blocks and may be faster than conventional methods that verify the entire source binary code. Furthermore, it will be appreciated that verifying only the RSB elements of the translated code block, according to embodiments of the invention, does not compromise the quality of the translated target binaries.

The efficiency of source fragment verification for translation reuse may be measured by a parameter referred to herein as "Repeating Verification Ratio" (RVR). The RVR parameter may be defined as a ratio between the number of source fragments that are verified more than once, and the number of all verified source fragments. Additionally or alternatively, the efficiency of source fragment verification may be measured by a parameter referred to herein as "Needless Verification Ratio" (NVR). The NVR may be defined as a ratio between the number of source fragments that are verified but whose verification results are not actually used, and the total number of verified source fragments.

Verifying only the RSB elements of a translated code block, according to exemplary embodiments of the invention, may reduce the NVR of the translator and, thus, improve translation efficiency. However, it is appreciated that even if the NVR is minimal, the same source fragment may be verified more than once for different translated code blocks, because a given source fragment, e.g., source fragment 12, may relate to several translated code blocks, e.g., translated code blocks 21 and 22. This potential redundancy is overcome by some exemplary embodiments of the invention, e.g., by properly grouping the RSB elements of the translated code blocks, thereby further improving the translation efficiency in terms of the RVR parameter, as described in detail below.

Figure 3:
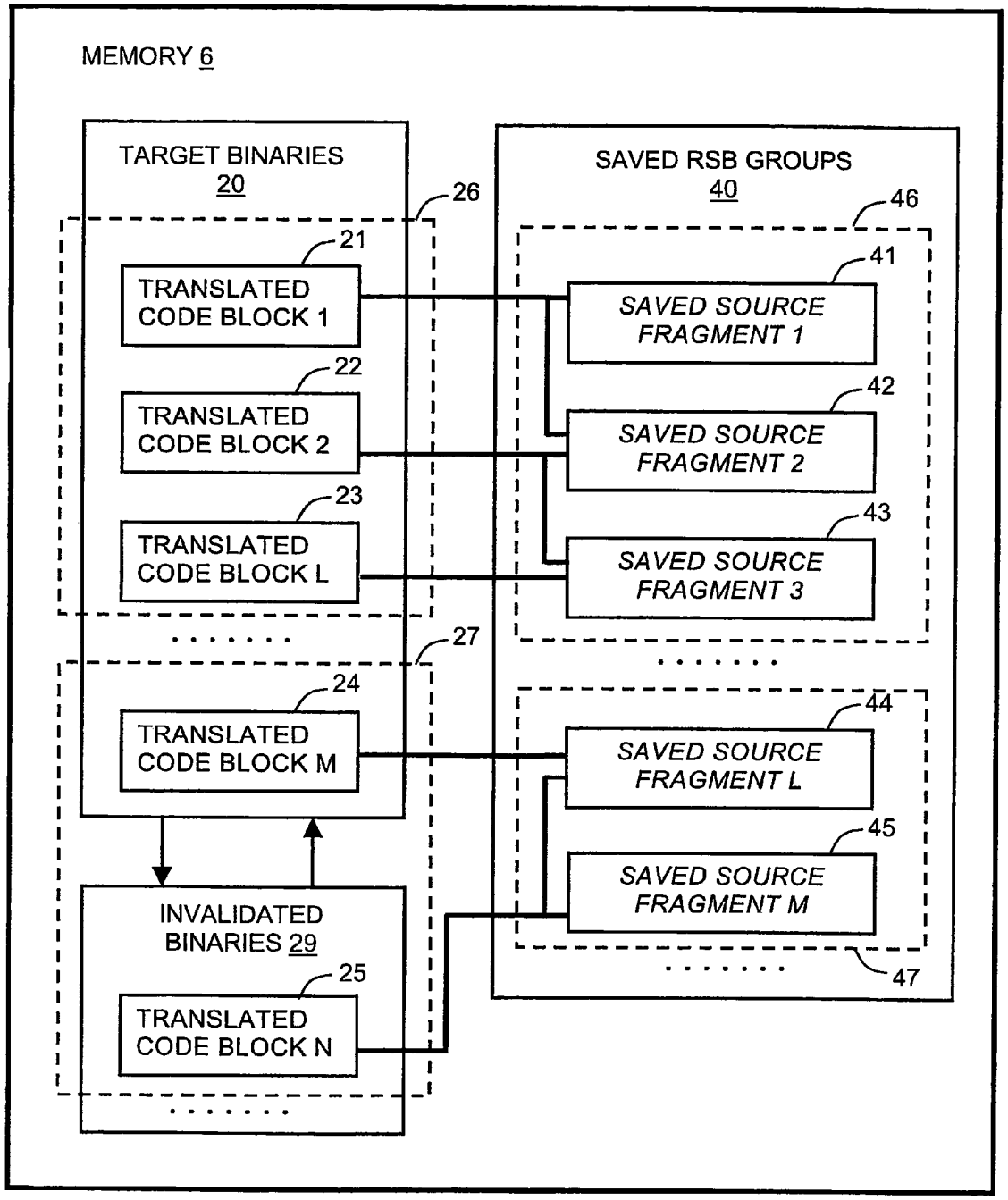
FIG. 3 is a block diagram illustration of a method of grouping translated code blocks and their related source fragments according to exemplary embodiments of the invention.

FIG. 3 is a block diagram illustration of a method of grouping translated code blocks and corresponding source fragments according to exemplary embodiments of the invention.

According to exemplary embodiments of the invention, the efficiency of a dynamic binary translator, as measured by for example, RVR, may be improved by grouping translated code blocks into one or more code block groups, e.g., groups 26 and 27 as shown in FIG. 3. A code block group, e.g., group 26, may share a group of source fragments, e.g., source group 46. Source fragments corresponding to a group of translated code blocks may be the union of the RSB elements of all the group members, and may be saved as part of a RSB groups 40 in memory 6, separately from the original source fragment 10 (FIG. 1). According to embodiments of the invention, during dynamic binary translation, consistency of source fragments may be verified for a group, rather than for individually translated code blocks. Such group verification, according to exemplary embodiments of the invention, may prevent repeated and/or unnecessary verification of certain source fragments and, therefore, may reduce overhead associated with dynamic binary translation.

As shown in FIG. 3, translated code blocks 21 and 22 of target binaries 20 may share a common source fragment 42, which may be saved as a RSB element of source group 46. Similarly, translated code blocks 22 and 23 may share a common source fragment 43, which may also be saved as a RSB element of group source 46. According to exemplary embodiments of the invention, translated code blocks 21, 22, and 23, whose RSB elements may intersect with each other, may be included in code block group 26 and may share source fragments of group 46. Similarly, translated code blocks 24 and 25 may be included in another code block group e.g., group 27, and may share source fragments of group 47. In this example, the reusability status of group 27 may be marked as non-reusable, as described in more detail below. In some embodiments, translated code block 25 may belong to a group 29 of invalidated binaries, and may be revived during the process of dynamic binary translation, as discussed in detail below with reference to FIG. 4 and FIG. 6.

In a RSB group such as, for example, source group 46, overlapping RSB elements, for example, source fragments 42 and 43, may be saved only once but may be referenced by multiple translated code blocks. In this manner, there may be less, or no duplicated RSB elements in any single group. The reusability status of a group to which a translated code block belongs may be used to determine the reusability status of the translated code block. If the group is marked as reusable, the code block may then be determined to be reusable. If the reusability status of the group is marked as unknown, reuse engine 33 may need to re-verify consistency of the group's RSB elements. If all of the RSB elements are verified to be consistent, the group may be re-marked as reusable, and the code block may be reused.

The process of grouping source fragments and verifying reusability of the group, according to embodiments of the invention, may result in a low, or even zero, RVR, a reduction in verification time, and conservation of storage space needed to contain the source fragments.

Figure 4:
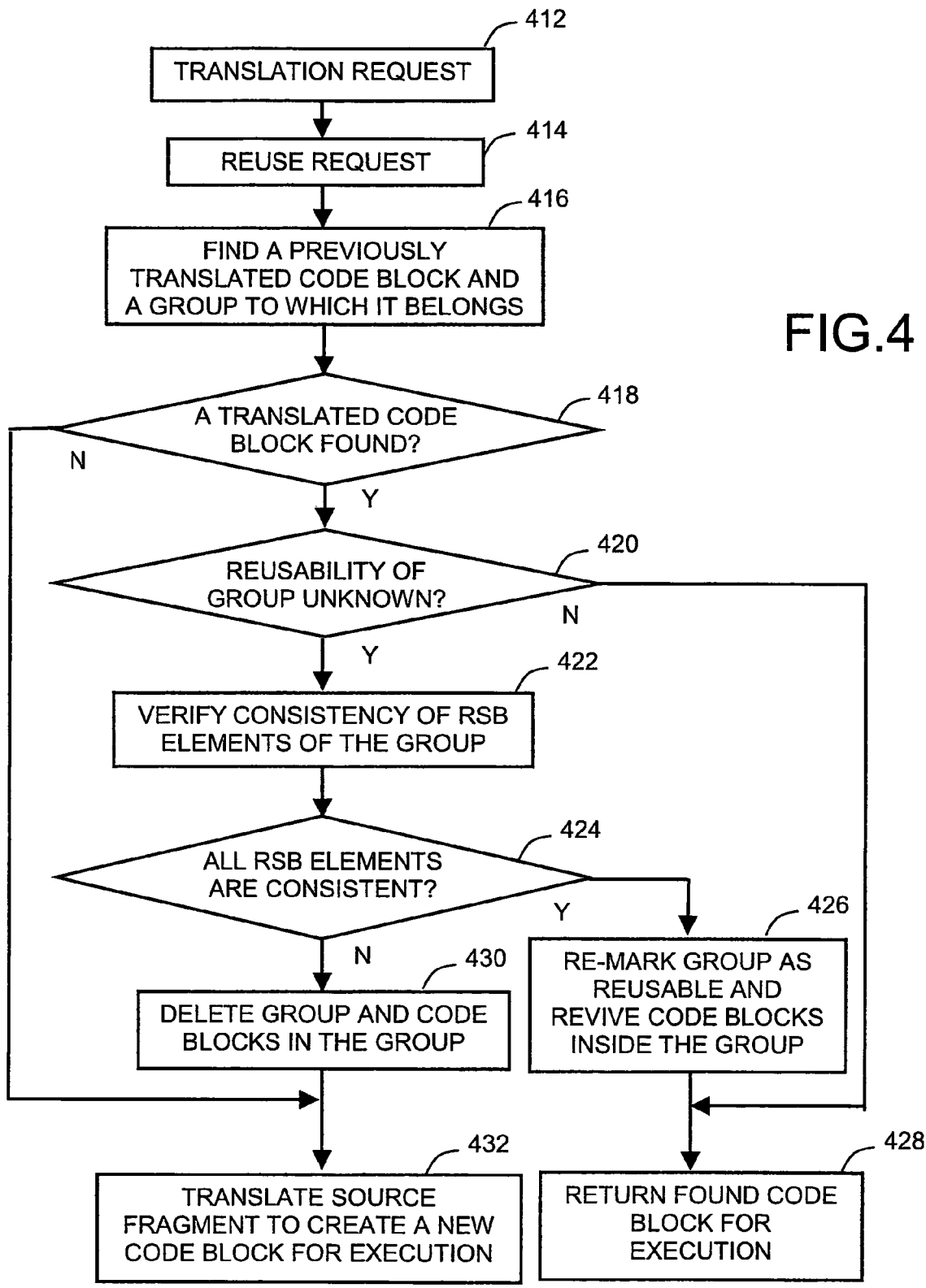
FIG. 4 is a schematic flowchart of a method of dynamic binary translation using translation reuse according to exemplary embodiments of the invention.

FIG. 4 is a schematic flowchart of a method of dynamic binary translation using translation reuse according to exemplary embodiments of the invention.

During execution of source binaries, execution engine 31 (FIG. 1) may control the flow of execution of corresponding translated target binaries. The execution flow may reach a current source fragment, which may include a set of source instructions of any size, for which execution engine 31 may be unable to identify a corresponding previously translated code block. In such case, as indicated at box 412, execution engine 31 may send a translation request to translation engine 32 (FIG. 1) to translate the current source fragment to be executed by a target processor complying with a target architecture, e.g., processor 4 (FIG. 1).

Upon receiving the translation request at box 412, translation engine 32 may send a reuse request to reuse engine 33 (FIG. 1), as indicated at box 414, in order to find or locate a previously translated code block that relates to the source fragment being currently processed. According to some embodiments of the invention, certain previously translated code blocks may be effectively inaccessible to execution engine 31. For example, by marking as "unknown" the reusability status of a group to which the previously translated code block belongs, reuse engine 33 may prevent a previously translated code block, whose consistency with a relating source fragment has not been verified, from being accessed by execution engine 31. The execution engine may be prevented from accessing a translated code block at various events, for example, upon loading and/or unloading of a dynamic link library (DLL) containing the source fragment.

As indicated at box 416, reuse engine 33 may attempt to find or locate the previously translated code block, as described above, as well as a group to which the translated code block may belong. At box 418, if none of the translated code blocks is determined to meet the requirement of the reuse request, reuse engine 33 may send translation engine 32 an indication that a reusable translated code block for the source fragment cannot be found or located.

After receiving the indication at box 418 that no reusable translated code block can be found or located, at box 432 translation engine 32 may proceed to translate the source fragment. A newly translated code block may subsequently be generated and sent for execution by execution engine 31. More details concerning the translation process performed by translation engine 32 are described below with reference to FIG. 5.

If a corresponding translated code block, e.g., code block 23 (FIG. 3), is identified at box 418, reuse engine 33 may proceed to verify the reusability status of the identified code block, e.g., code block 23. At box 420, reuse engine 33 may read the reusability status marking of a group, e.g., group 26 (FIG. 3), to which the identified code block 23 belongs. If group 26 is marked as reusable, indicating that all the translated code blocks in the group, i.e., code blocks 21, 22, and 23 (FIG. 3), are reusable, then the identified code block 23 is determined to be reusable. Reuse engine 33 may then terminate the reusability verification process and, as indicated at box 428, may send the identified code block, i.e., code block 23, to translation engine 32. Translation engine 32 may in turn pass the identified code block 23 to execution engine 31 for execution.

If a corresponding translated code block, e.g., code block 24 (FIG. 3), is found and the reusability status of the group to which code block 24 belongs, e.g., group 27, is marked as unknown, reuse engine 33 may proceed at box 422 to verify the consistency of each RSB element related to the group, e.g. group 27. If all the RSB elements related to the group, e.g., group 27, are verified to be consistent at box 424, then at box 426 the group, e.g., group 27, may be re-marked as reusable. At this point, any translated code blocks, e.g., group 25, in the invalidated binaries group 29 (FIG. 3) that also belong to code block group 27 may be revived. The identified code block, e.g., code block 24, may then be considered reusable and be passed at box 428 to translation engine 32. Translation engine 32 may subsequently pass code block 24 to execution engine 31 for execution.

If at box 424 one or more of the RSB elements related to the group, e.g., group 27, are identified to be inconsistent, the group, e.g., group 27, may be considered non-reusable. In such a case, the group, e.g., group 27, may be deleted, as indicated at box 430, and all the translated code blocks in the group, including the identified code block 24, may be deemed to be non-reusable and be deleted. Reuse engine 33 may then send translation engine 32 an indication that a reusable translated code block has not been successfully located for the source fragment.

Translation engine 32 may then proceed to generate a new translated code block by translating the source fragment at box 432. The newly translated code block may then be passed for execution by execution engine 31. More details of the process of translating source fragments are described below.

Figure 5:
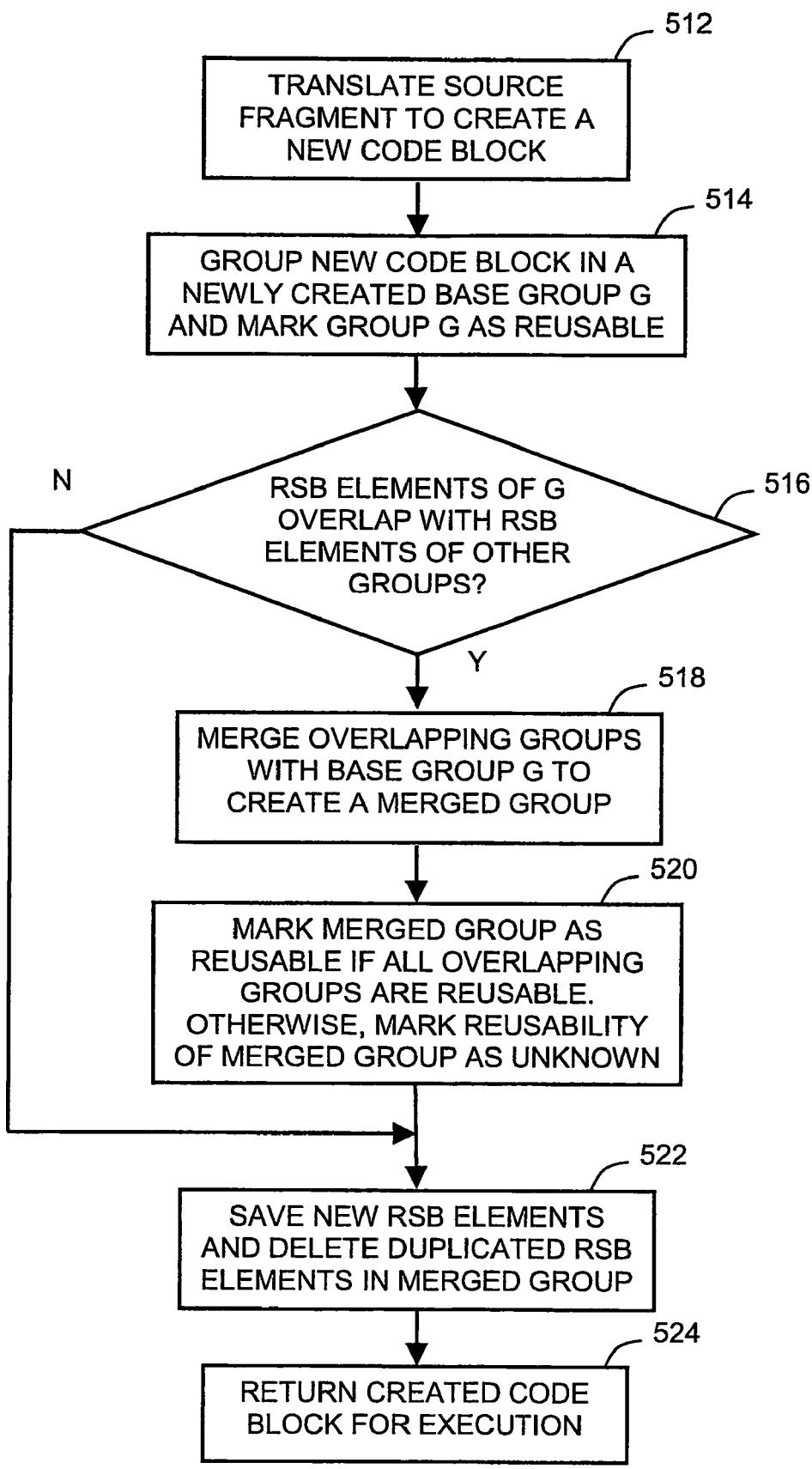
FIG. 5 is a schematic flowchart of a method of processing a translated code block for translation reuse during dynamic binary translation according to exemplary embodiments of the invention.

FIG. 5 is a schematic flowchart of a method of processing a newly translated code block for translation reuse during dynamic binary translation according to exemplary embodiments of the invention.

When reuse engine 33 (FIG. 1) is unable to find or locate a corresponding translated code block at box 418 (FIG. 4), or when an identified code block is determined to be non-reusable at box 430 (FIG. 4), translation engine 32 (FIG. 1) may translate the source fragment into a new code block as indicated at box 512. The newly translated code block, referred to herein as "code block-C", may then be assigned to a newly created base group, referred to herein as "group-G". The newly created code block-C is by definition reusable since all of its RSB elements are consistent. Therefore, the new base group-G may be marked as reusable, as indicated at box 514.

At box 516, translation engine 32 may verify elements, e.g., source fragments, of the newly created code block-C of base group-G against RSB elements, e.g., source fragments, of other groups of translated code blocks. If none of the RSB elements of base group-G is identified to intersect, or overlap, with RSB elements of the other groups, then base group-G may be categorized as a new group, and the marking of base group-G may remain as reusable. In this case, all of the RSB elements of code block-C are by default new to base group-G and are saved as a new RSB group, as indicated at box 522. The newly created code block-C may subsequently be passed for execution by execution engine 31, as indicated at box 524.

Alternatively, if one or more RSB elements of base group-G are found to intersect, or overlap, with one or more RSB elements of one of the existing groups, e.g., "group-O", then at box 518 base group-G may be merged with group-O into form a new group, e.g., "group-N". At box 520, the reusability status of group-N may be marked the same as that of group-O. Following the merging at box 522, any RSB elements of base group-G that do not intersect or overlap with RSB elements of group-O may be saved in group-N.

Alternatively, if one or more RSB elements of base group-G intersect, or overlap, with RSB elements of multiple groups of translated code blocks, the multiple groups may be merged together with base group-G at box 518 to form a new merged group, e.g., "group-M". If the reusability status of one or more of the multiple groups is marked as unknown, group-M may also be marked as unknown. Otherwise, if all the merging groups are marked as reusable, group-M may be marked as reusable. At box 522, the RSB elements of base group-G that are not found in any of the merging groups may be added into group-M and may be saved in group-M. According to exemplary embodiments of the invention, RSB elements of all the merging groups that overlap with each other may only be saved once in group-M, such that no duplicated RSB element may be saved in group-M.

After merging base group-G with one or more groups of translated code blocks, code block-C of base group-G may subsequently be passed for execution by execution engine 31, as indicated at box 524.

Figure 6:
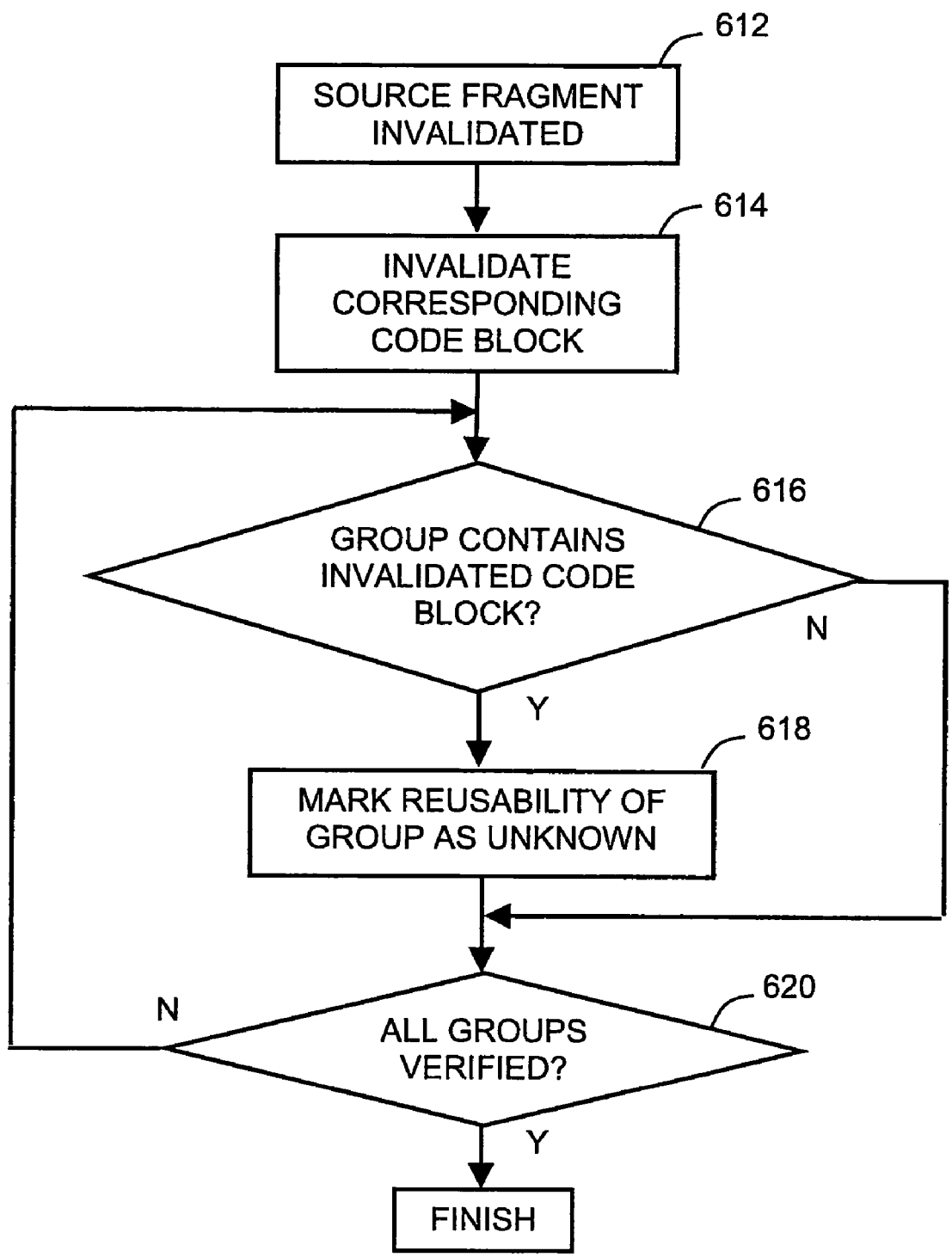
FIG. 6 is a schematic flowchart of a method of setting reusability status markings of groups of translated code blocks during translation of a source binary code according to exemplary embodiments of the invention.

FIG. 6 is a schematic flowchart of a method of setting or modifying the reusability status markings of groups of translated code blocks during dynamic binary translation according to exemplary embodiments of the invention.

As indicated at box 612, in some embodiments of the invention, during execution of the source binaries, a source fragment, e.g., a source instruction or a set of source instructions of any size, may be invalidated. Invalidation may be due to modules being unloaded, modified, or due to termination of a process and the likes. At box 614, translated code blocks that correspond to the invalidated source fragment may need to be invalidated and may be moved or copied to a separate group, e.g., invalidated binaries group 29 (FIG. 3).

When a source fragment, for example, source fragment 45 (FIG. 3), is invalidated at box 612, some or all groups of translated code blocks, for example, groups 26 and 27 (FIG. 3), may need to be re-verified for their reusability status marking based on whether each group includes translated code blocks that should be invalidated due to invalidity of their corresponding source fragments. At box 616, if a translated code block group is identified to include one or more invalidated code blocks, e.g., code block 25, the reusability status marking of that group, for example, translated code block group 27 (FIG. 3) may be changed to unknown, as indicated at box 618. The invalidated translated code block, for example, code block 25 (FIG. 3), may be moved, for example, to invalidated binaries group 29 (FIG. 3). At box 620, if it is determined that there are additional groups that require re-verification of reusability status, the verification process may continue, as indicated at box 614, until all the groups are re-verified.

In some cases, the reusability status of a group may be revived from unknown to reusable. This may be the case, for example, during verification of consistency of RSB elements at box 426 during execution of dynamic binary translation as described above with reference to FIG. 4. Consequently, other translated code blocks belonging to the same group may also be revived as described above with reference to FIG. 3.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. A method for determining if a code block is reusable, the method comprising:

identifying a previously translated code block relating to a source fragment to be translated for execution by a target architecture that the previously translated code block having related source binary elements related thereto and belonging to a group of previously translated code blocks, wherein the group of previously translated code blocks shares a source group of source fragments, the source fragments of the source group including at least the union of the related source binary elements of all members of the group of previously translated code blocks, and wherein the related source binary elements of the source group are stored separately in memory from a source binary code from which the source fragments have been translated;

determining whether or not said previously translated code block is reusable based on a reusability status of the group of previously translated code blocks to which said previously translated code block belongs;

if said previously translated code block is determined to be reusable, reusing said previously translated code block;

if said code block relating is not reusable or said source fragment has not been previously translated:

translating said source fragment into a newly translated code block in the target binary code for execution by a target processor complying with said target architecture;

executing said newly translated code block on the target processor complying with the target architecture;

creating a base group containing said newly translated code block and relating to the source fragment;

marking a reusability status of said base group as reusable;

identifying one or more other groups of previously translated code blocks for which a related one or more source fragments intersects with the source fragment relating to said base group; and merging said one or more other groups of previously translated code blocks with said base group into a merged group, the source fragments relating to the merged group including a union of the source fragments relating to said one or more other groups and relating to said base group, excluding duplicate source fragments.

2. The method of claim 1, wherein determining said reusability status comprises verifying consistency of one or more source fragments relating to said group.

3. The method of claim 1, wherein determining said reusability status comprises reading a reusability status marking of said group.

4. The method of claim 1, comprising marking the reusability status of said group of previously translated code blocks as reusable if one or more source fragments relating to said group are found to be consistent.

5. The method of claim 1, comprising deleting said group of previously translated code blocks if one or more source fragments relating to said group are found to be inconsistent.

6. The method of claim 1, comprising marking the reusability status of said group of previously translated code blocks as unknown if one or more source fragments relating to said group are invalidated.

7. The method of claim 1, comprising marking said merged group as reusable if said one or more groups of previously translated code blocks are marked as reusable.

8. The method of claim 1, comprising marking said merged group as unknown if any of said one or more groups of previously translated code blocks are marked as unknown.

9. An apparatus for determining if a code block is reusable, the apparatus, comprising:
   a processor able to identify a previously translated code block relating to a source fragment to be translated for execution by a target processor complying with a target architecture, the previously translated code block having related source binary elements related thereto and belonging to a group of previously translated code blocks, wherein the group of previously translated code blocks shares a source group of source fragments, the source fragments of the source group including at least the union of the related source binary elements of all members of the group of previously translated code blocks, and wherein the related source binary elements of the source group are stored separately in memory from a source binary code from which the source fragments have been translated; to determine whether or not said previously translated code block is reusable based on a reusability status of the group of previously translated code blocks to which said previously translated code block belongs, to reuse said previously translated code block if said previously translated code block is determined to be reusable; and to, if said code block is not reusable or said source fragment has not been previously translated:
   translate said source fragment into a target code block in the target binary code for execution by the target processor complying with the target architecture;
   create a base group containing said newly translated code block and relating to the source fragment;
   mark a reusability status of said base group as reusable;
   identify one or more other groups of previously translated code blocks
   for which a related one or more source fragments intersects with the source fragment relating to said base group; and
   merge said one or more other groups of previously translated code blocks with said base group into a merged group, the source fragments relating to the merged group including a union of the source fragments relating to said one or more other groups and relating to said base group, excluding duplicate source fragments.

10. The apparatus of claim 9, wherein said processor is able to reuse said previously translated code block if said previously translated code block is determined to be reusable.

11. The apparatus of claim 9, wherein said processor is able to determine said reusability status by verifying consistency of one or more source fragments relating to said group.

12. The apparatus of claim 9, wherein said processor is able to determine said reusability status by reading a reusability status marking of said group.

13. The apparatus of claim 9, wherein said processor is able to mark the reusability status of said group of previously translated code block as reusable if one or more source fragments relating to said group are found to be consistent.

14. The apparatus of claim 9, wherein said processor is able to delete said group of previously translated code blocks if one or more source fragments relating to said group are found to be inconsistent.

15. The apparatus of claim 9, wherein said processor is able to mark the reusability status of said group of previously translated code blocks as unknown if one or more source fragments of said group are invalidated.

16. The apparatus of claim 9, wherein said processor is able to mark said reusability status of said merged group as reusable if said one or more groups of previously translated code blocks are marked as reusable.

17. The apparatus of claim 9, wherein said processor is able to mark said reusability status of said merged group as unknown if any of said one or more groups of previously translated code blocks are marked as unknown.

18. A system for determining if a code block is reusable, the system, comprising:
   a processor able to identify a previously translated code block relating to a source fragment to be translated for execution by a target processor complying with a target architecture, the previously translated code block having related source binary elements related thereto and belonging to a group of previously translated code blocks, wherein the group of previously translated code blocks shares a source group of source fragments, the source fragments of the source group including at least the union of the related source binary elements of all members of the group of previously translated code blocks, and wherein the related source binary elements of the source group are stored separately in memory from a source binary code from which the source fragments have been translated; to determine whether or not said previously translated code block is reusable based on a reusability status of the group of previously translated code blocks to which said previously translated code block belongs, to reuse said previously translated code block if said previously translated code block is determined to be reusable, and to, if said code block is not reusable or said source fragment has not been previously translated:
   translate said source fragment into a target code block in the target binary code for execution by the target processor complying with the target architecture;
   create a base group containing said newly translated code block and relating to the source fragment;
   mark a reusability status of said base group as reusable;
   identify one or more other groups of previously translated code blocks for which a related one or more source fragments intersects with the source fragment relating to said base group; and
   merge said one or more other groups of previously translated code blocks with said base group into a merged group, the source fragments relating to the merged group including a union of the source fragments relating to said one or more other groups and relating to said base group, excluding duplicate source fragments; and
   a memory able to store said group of previously translated code blocks.

19. The system of claim 18, wherein said processor is able to determine said reusability status by verifying consistency of one or more source fragments relating to said group.

20. A machine-readable medium having stored thereon a set of instructions that, when executed by a machine, result in identifying a previously translated code block relating to a source fragment to be translated for execution by a target architecture, the previously translated code block having related source binary elements related thereto and belonging to a group of previously translated code blocks, wherein the group of previously translated code blocks shares a source group of source fragments, the source fragments of the source group including at least the union of the related source binary elements of all members of the group of previously translated code blocks, and wherein the related source binary elements of the source group are stored separately in memory from a source binary code from which the source fragments have been translated; determining whether or not said previously translated code block is reusable based on a reusability status of the group of previously translated code blocks to which said previously translated code block belongs; if said previously translated code block is determined to be reusable, reusing said previously translated code block;

if said code block is not reusable or said source fragment has not been previously translated:

translating said source fragment into a target code block in the target binary code for execution by a target processor complying with said target architecture;

creating a base group containing said target code block and relating to the source fragment;

marking a reusability status of said base group as reusable;

identifying one or more groups of previously translated code blocks for which a related one or more source fragments intersect with the source fragments relating to said base group; and merging said one or more other groups of previously translated code blocks with said base group into a merged group, the source fragments relating to the merged group including a union of the source fragments relating to said one or more other groups and relating to said base group, excluding duplicate source fragments.

21. The machine-readable medium of claim 20, wherein the instructions result in verifying consistency of one or more source fragments related to the group.

* * * * *